US010481811B2

(12) United States Patent
Govindaraju et al.

(10) Patent No.: US 10,481,811 B2
(45) Date of Patent: *Nov. 19, 2019

(54) ASYNCHRONOUS COPYING OF DATA WITHIN MEMORY

(71) Applicant: Google LLC, Mountain View, CA (US)

(72) Inventors: Rama Krishna Govindaraju, San Jose, CA (US); Liqun Cheng, Foster City, CA (US); Parthasarathy Ranganathan, San Jose, CA (US); Michael R. Marty, Madison, WI (US); Andrew Gallatin, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/242,669

(22) Filed: Jan. 8, 2019

(65) Prior Publication Data

US 2019/0163381 A1    May 30, 2019

Related U.S. Application Data

(63) Continuation of application No. 14/885,786, filed on Oct. 16, 2015, now Pat. No. 10,191,672.

(51) Int. Cl.
*G06F 3/06* (2006.01)
*G06F 12/1081* (2016.01)
*G06F 12/0888* (2016.01)

(52) U.S. Cl.
CPC ............ *G06F 3/0619* (2013.01); *G06F 3/065* (2013.01); *G06F 3/0683* (2013.01); *G06F 12/1081* (2013.01); *G06F 12/0888* (2013.01)

(58) Field of Classification Search
CPC ...... G06F 3/0619; G06F 3/065; G06F 3/0683; G06F 12/1081; G06F 12/0888
See application file for complete search history.

(56) References Cited

U.S. PATENT DOCUMENTS

| 2005/0154845 | A1 ‡ | 7/2005 | Shackelford | ........ G06F 11/2064 711/162 |
| 2009/0198897 | A1 ‡ | 8/2009 | Arimilli | .............. G06F 9/30032 711/12 |

(Continued)

FOREIGN PATENT DOCUMENTS

| CN | 1906594 | | 1/2007 |
| TW | 200411403 | | 3/2010 |
| TW | 1339793 | ‡ | 4/2011 |
| TW | I339793 | | 4/2011 |
| TW | I478055 | | 3/2015 |

OTHER PUBLICATIONS

"Intel QuickData Technology Software Guide for Linux", Intel Leap Ahead, White Paper, Server Platform Group, May 2008, 7 pages.‡

(Continued)

*Primary Examiner* — Eric Cardwell
(74) *Attorney, Agent, or Firm* — Fish & Richardson P.C.

(57) ABSTRACT

An example method includes during execution of a software application by a processor, receiving, by a copy processor separate from the processor, a request for an asynchronous data copy operation to copy data within a memory accessible by the copy processor, wherein the request is received from a copy manager accessible by the software application in a user space of an operating system managing execution of the software application; in response to the request, initiating, by the copy processor, the asynchronous data copy operation; continuing execution of the software application by the processor; determining, by the copy processor, that the asynchronous data copy operation has completed; and in response to determining that the asynchronous copy operation has completed, selectively notifying, by the copy processor, the software application that the asynchronous copy operation has completed.

20 Claims, 4 Drawing Sheets

(56) References Cited

U.S. PATENT DOCUMENTS

2009/0276571 A1 ‡ 11/2009 Benner ............... G06F 9/3824 711/11
2010/0058024 A1 ‡ 3/2010 Kawamura ........... G06F 9/3824 711/20
2011/0106905 A1 ‡ 5/2011 Frey ...................... H04L 69/166 709/21

OTHER PUBLICATIONS

Vaidyanathan et al., "Efficient Asynchronous Memory Copy Operations on Multi-Core Systems and I/OAT", published in 2007, 10 pages.‡

Regnier et al., "TCP Onloading for Data Center Servers" published in 2004, 11 pages.‡

Extended European Search Report issue in European Application No. 16193714.9, dated Mar. 20, 2017, 12 pages.

Office Action issued in Taiwanese Application No. 105133465, dated Oct. 30, 2017, 5 pages (English Translation).

Office Action issued in Taiwanese Application No. 105133465, dated Jul. 31, 2018, 7 pages. (English Translation).

EP Office Action issued in European Application No. 16193714.9, dated Mar. 7, 2019, 8 pages.

TW Office Action in Taiwan Appln. No. 107147426, dated May 30, 2019, 8 pages.

CN Office Action in Chinese Application No. 201610899744.0, dated Jun. 17, 2019, 22 pages (with English translation).

Vaidyanathan et al, "Efficient Asynchronous Memory Copy Operations on Multi-Core Systems and I/OAT" IEEE International Conference on Cluster Computing, 10 pages.

‡ imported from a related application

ASYNCHRONOUS COPYING OF DATA WITHIN MEMORY

CROSS-REFERENCE TO RELATED APPLICATION

This application is a continuation of U.S. application Ser. No. 14/885,786, filed Oct. 16, 2015, the contents of which are incorporated by reference herein.

BACKGROUND

This specification relates to techniques for performing copy operations within memory asynchronously.

During execution of a software application, a processor may need to frequently copy or move data within memory. For example, networking stacks may move data within memory from a user buffer at first location to a network buffer at a second location accessible by a network interface in order to send the data. Software applications may also perform explicit copying of data within memory from one location to another. When a large amount of data is copied, processing delays may occur if execution of the processor blocks while waiting for the copy operation to complete.

SUMMARY

The subject matter of this application generally relates to computer memory, and specifically to techniques for performing copy operations within memory asynchronously.

In general, one innovative aspect of the subject matter described in this specification can be embodied in methods that include during execution of a software application by a processor, receiving, by a copy processor separate from the processor, a request for an asynchronous data copy operation to copy data within a memory accessible by the copy processor, wherein the request is received from a copy manager accessible by the software application in a user space of an operating system managing execution of the software application; in response to the request, initiating, by the copy processor, the asynchronous data copy operation; continuing execution of the software application by the processor; and determining, by the copy processor, that the asynchronous data copy operation has completed; in response to determining that the asynchronous copy operation has completed, selectively notifying, by the copy processor, the software application that the asynchronous copy operation has completed.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The techniques described can use virtual (or kernel addresses) as arguments with arbitrary alignment and arbitrary length possibly crossing page boundaries. The techniques can accomplish a copy asynchronously allowing a central processing unit (CPU) to overlap the copy operation with other work that can be done by the processor, and which is not possible if the processor is engaged in the copy operation. The techniques can allow for a synchronous or an asynchronous notification of completion of the copy. Further, control of whether the contents of the source address or the destination address and their ranges should be brought into cache. By allowing software applications to initiate asynchronous copy operations using virtual addresses without involving the operating system kernel, the number of mode switches between user space and kernel space during a copy operation may be reduced, which may lead to increased performance. In addition these controls will allow for more efficient utilization of the caches resulting in improved performance.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The present disclosure relates to providing techniques for asynchronous memory copying and cache management.

Many modern processors operate at high clock speeds, meaning that even slight delays in processing may lead to large numbers of lost cycles and decreased performance. For example, a processor capable of 10 billion instructions per second could execute 10 instructions in a nanosecond spent waiting for a blocking operation to complete. In many cases, a memory copy operation can be a relatively slow operation compared to a processor's speed. During the copy operation, if the processor is engaged in load-store operations for the copying, the processor is unable to perform other work. In the case of copies of large amounts of data, potentially useful processor cycles may be wasted as the processor waits for the copy to complete. If such copy operations are frequent, the efficiency of the processor can be hampered by several percent, or even more.

Moreover, in many cases, copying data causes data to be brought into a cache. If this data is not going to be reused relatively frequently or not used at all, then bringing the data into a cache pollutes the working set within the cache and prevents other, possibly more useful, data from being cached or being evicted from cache.

The present disclosure relates to techniques for an asynchronous copying of data. One example technique includes using a copy processor that is separate from a central processing unit (CPU) to asynchronously copy data independently from the CPU. The CPU can perform other operations as the copy processor performs the asynchronous copy. The asynchronous copy operation of the copy processor can be controlled by an asynchronous copy manager (ACM) accessible from a user space. The copy processor may be capable of taking virtual addresses as parameters eliminating the need for expensive mode switches from user space to/from a kernel space can be reduced or eliminated during these copy operations. The copy processor can notify the asynchronous copy manager that the copy has completed, or the asynchronous copy manager can poll the copy processor to determine when the copy has completed. The asynchronous copy manager can also include cache management. For example, a cache flag can be set by the asynchronous copy manager to determine whether or not the copy processor caches the data. The asynchronous copy techniques described can be implemented without significant changes to operating system memory access operations.

Figure 1:
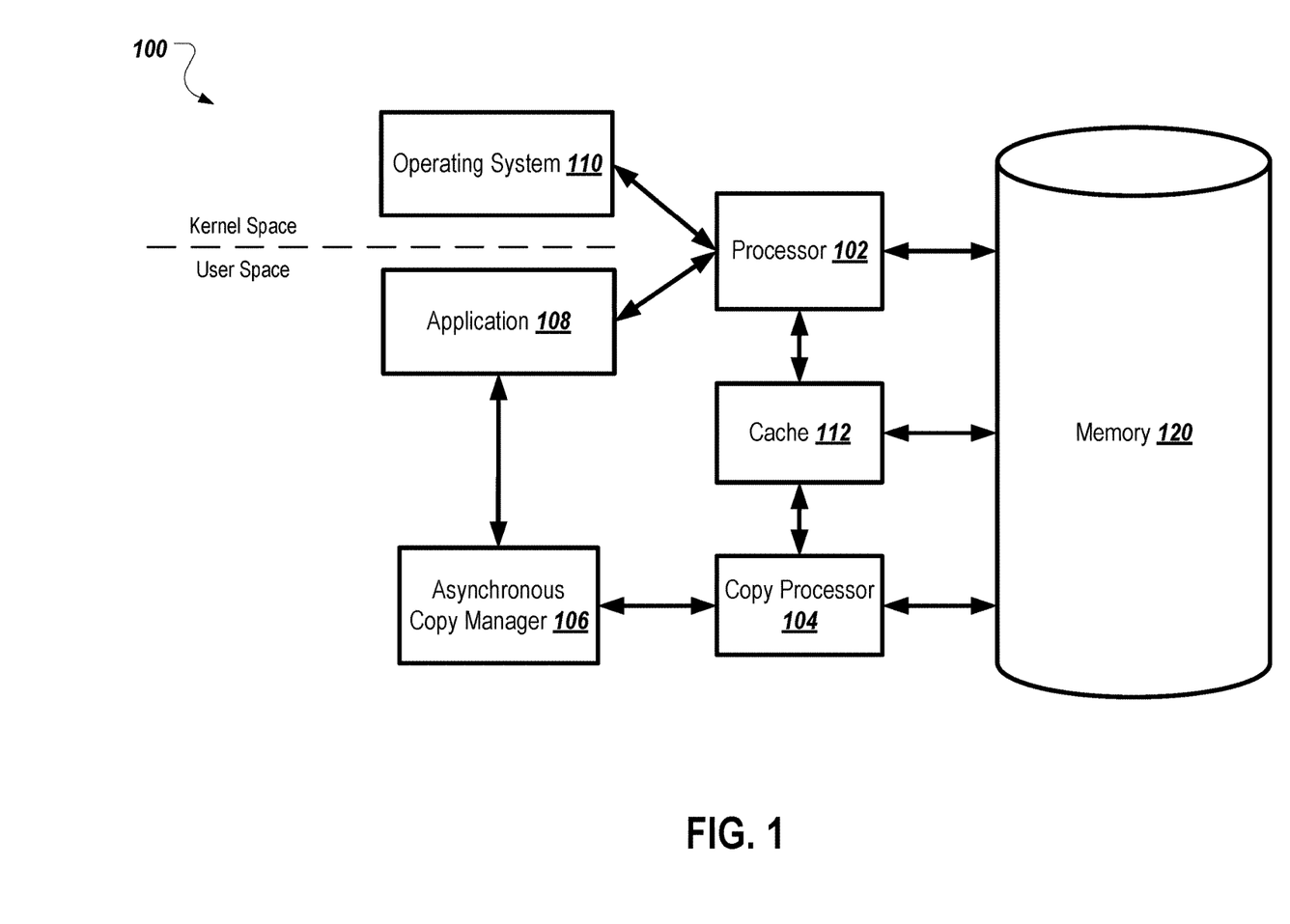
FIG. 1 is a block diagram of a system in which an asynchronous copy process can be implemented.

FIG. 1 is a block diagram of a system 100 in which an asynchronous copy process can be implemented. As shown, system 100 includes a processor 102 coupled to a cache 112 and a memory 120. An operating system 110 executes on and interacts with the processor 102. The operating system 110 manages one or more user applications 108 and an asynchronous copy manager (ACM) 106. The asynchronous copy manager 106 is also coupled to a copy processor 104. The copy processor 104 is also coupled to a memory 120 and a cache 112.

The system 100 includes a processor 102. In some implementations, the processor 102 may be a general-purpose central processing unit (CPU) included a computer system. The processor 102 may also be a special purpose or embedded processor, or a special-purpose controller for a particular system or subsystem. Although a single processor 102 is shown in FIG. 1A-B, in some implementations, two or more processors 102 may be included. In some implementations, the processor 102 may be an x86 compatible processor, or may also be another type of processor.

In some implementations, the processor 102 may include one or more processor cores (not shown), each capable of executing one or more threads of execution. The processor cores may execute these threads simultaneously with one another. In some implementations, the processor 102, the processor cores, or both components may include integrated storage for caching data. The processor 102 or the processor cores may also include microcode including instructions defining the behavior of the components.

The system includes a copy processor 104 configured to perform data copy operations within the memory 120. The copy processor 104 can be incorporated in the processor 102 (e.g., as a component separate from the processor cores). In some implementations, the copy processor 104 is integrated in the same package as the processor 102, or is part of a "system-on-a-chip" including the processor 102. The copy processor 104 can also be a hardware component separate from the processor 102 or a separate module coupled to the processor 102. The copy processor 104 can be implemented as part of an integrated input/output device or as part of a direct memory access (DMA) system.

The system 100 also includes a memory 120 or multiple memories 120. The memory 120 may include any type of memory or database module and may take the form of volatile and/or non-volatile memory including, without limitation, magnetic media, optical media, random access memory (RAM), read-only memory (ROM), or any other suitable local or remote memory component. The memory 120 may also include cache memory integrated into the processor 102, processor cores, or other components within the system 100.

System 100 also includes an operating system 110. In operation, the operating system 110 executes on the processor 102, and directs the processor 102 to execute the one or more user applications 108. The operating system 140 may be a commercial or open source operating system executing on the processor 10.

The software application 108 executed by processor 102 can originate an asynchronous copy operation. The software application 108 can interface with an asynchronous copy manager 106 to perform and coordinate the asynchronous copy. For example, the application 108 can call functions defined in the asynchronous copy manager 106 to initiate the asynchronous copy. In response, the asynchronous copy manager 106 can request the copy processor 104 to perform the data copy in the memory 120. In some cases, the asynchronous copy manager 106 can be explicitly called from the application 108 for an asynchronous copy operation, or can be called in response to a call to a standard operating system routine for copying memory (e.g., memcpy). In such a case, the implementation of memcpy may include instructions to determine whether the particular copy operation should be executed asynchronously, and, if so, to initiate the asynchronous copy. Such an implementation may allow the present techniques to be utilized without changes to the software application 108.

As the copy processor 104 is separate from the processor 102, the processor 102 is free to continue execution during the asynchronous copy operation. For example, the processor 102 could continue executing the application 108, another application, or other perform other operations during the copy operation. The processor 102 could continue executing other instructions of the software application 108 that do not depend on the results of the copy operation. In another example, the processor 102 could perform a context switch to another software application and execute that application while the asynchronous copy operation is performed. Moreover, as the copy processor 104 is accessible from user space via the asynchronous copy manager 106, no context switch may be necessary when performing the copy operation. In particular, the processor 102 may not be required to perform a mode switch to the operating system 110 in order to initiate the asynchronous copy operation, leading to increased performance. In some cases, if a resource is occupied, the copy operation can default to the standard synchronous load-store technique. For example, if the copy processor 104 is unavailable to perform an asynchronous copy operation, the operating system 110 can use the processor 102 to perform a standard copy operation instead.

The asynchronous copy manager 106 can also ensure that memory remains protected during an asynchronous copy operation. For example, prior to or during the asynchronous copy operation, the asynchronous copy manager 106 can protect locations in the memory 120 corresponding to a source address within the memory 120 from which to copy data and a destination address within the memory 120 to receive the data. After the copy operation completes, the asynchronous copy manager 106 can unprotect the memory locations to allow access.

In some cases, the asynchronous copy manager 106 can protect the locations in memory 120 without "pinning" memory pages associated with the locations. Pinning a memory page involves marking the page so that it will not be swapped to a physical memory location outside the memory 120, such as, for example, a secondary storage location (e.g., a hard drive). In an implementation that does not pin memory pages, the asynchronous copy manager 106 may protect virtual memory pages corresponding to the physical locations After the copy operation has completed, the asynchronous copy manager 106 can then unprotect the locations in memory 120. In some cases, the asynchronous copy manager 106 can use a translation lookaside buffer (TLB) for facilitating asynchronous copy operations. The asynchronous copy manager 106 can keep the TLB synchronized with any kernel remapping activities to maintain a consistent page table. In some cases, upon the occurrence of a page fault, the asynchronous copy manager 106 can generate a precise interrupt. The precise interrupt can include information such as an indication that the memory location is currently being copied and cannot be written. The software application 108 can be implemented to handle such an indication, such as by retrying the copy operation after a particular amount of time to allow the copy operation to complete. In some implementations, if a page fault is encountered the operation can be retried through the regular load/store copy mechanism.

In some implementations, the asynchronous copy manager 106 request to the copy processor 104 can include a notification indication that indicates how the notification of asynchronous copy operation completion is to be handled. The notification indication could, for example, indicate to the copy processor 104 that the asynchronous copy manager 106 will poll until a completion flag is set. For example, the copy processor 104 could write a completion word or completion bit to a specific memory location upon completion of the asynchronous copy operation, and the asynchronous copy manager 106 could poll that memory location to determine the status of the copy operation. The notification indication could, for example, indicate to the copy processor 104 that the copy processor 104 should pass an interrupt to the asynchronous copy manager 106 upon completion of the asynchronous copy operation. The asynchronous copy manager 106 can handle the interrupt itself or allow an interrupt handler to handle the interrupt.

In some implementations, the asynchronous copy manager 106 can provide techniques for asynchronously copying large amounts of data. For example, the asynchronous copy manager 106 can limit the number of bytes copied at one time. For example, the bytes copied at one time can be limited to a number such as 512 bytes, 64K bytes, or another number of bytes. In some cases, a large amount of data to be copied can be divided into smaller portions. For example, 1 Gb of data can be divided into 64 Kb portions before copying. In this manner, other copying operations do not have to wait for the entire large data file to be copied before commencing, but can be interleaved within operations copying the smaller divided data portions. In some cases, the asynchronous copy manager 106 can switch during the copy of a large amount of data so that a smaller amount of data can be copied. For example, the large data copy operation could be paused so that the smaller data copy operation does not have to wait for the large data copy operation to complete. For example, during a large data copy operation, the asynchronous copy manager 106 could save information such as the source address, destination address, number of total bytes, the current memory position, or other information. After copying the smaller data, the asynchronous copy manager 106 could continue the large data copy based on the saved information. In some cases, threads executed on the processor 102 can each have a dedicated asynchronous copy manager 106, and in some cases, multiple threads can share a single asynchronous copy manager 106. In some implementations, the system 100 may include multiple copy managers, allowing large copy operations to be parallelized into multiple smaller copy operations.

In some implementations, the asynchronous copy manager 106 provides cache control. In some cases, the application 108 can signal the asynchronous copy manager 106 to determine the caching behavior. For example, the application 108 can call an asynchronous copy manager 106 function including a cache flag indicating whether or not to cache the data (either the source or destination). In some implementations, the asynchronous copy manager 106 can determine whether the data to be copied is cached. For example, the asynchronous copy manager 106 can analyze the software application (e.g., by examining future instructions to be executed in the current application context or past execution history) and predict if the copied data is likely to be used in the future. If the data is likely to be used in the future, the asynchronous copy manager 106 could ensure the data is cached, and if the data is likely not to be used in the future, the asynchronous copy manager 106 could ensure the data is not cached. The asynchronous copy manager 106 can, for example, include a cache flag value in the copy request sent to the copy processor 104. For example, in a networking context, destination data in a network buffer or NIC DMA is rarely reused, and therefore can benefit from a signal that the destination data should not be cached.

Figure 2:
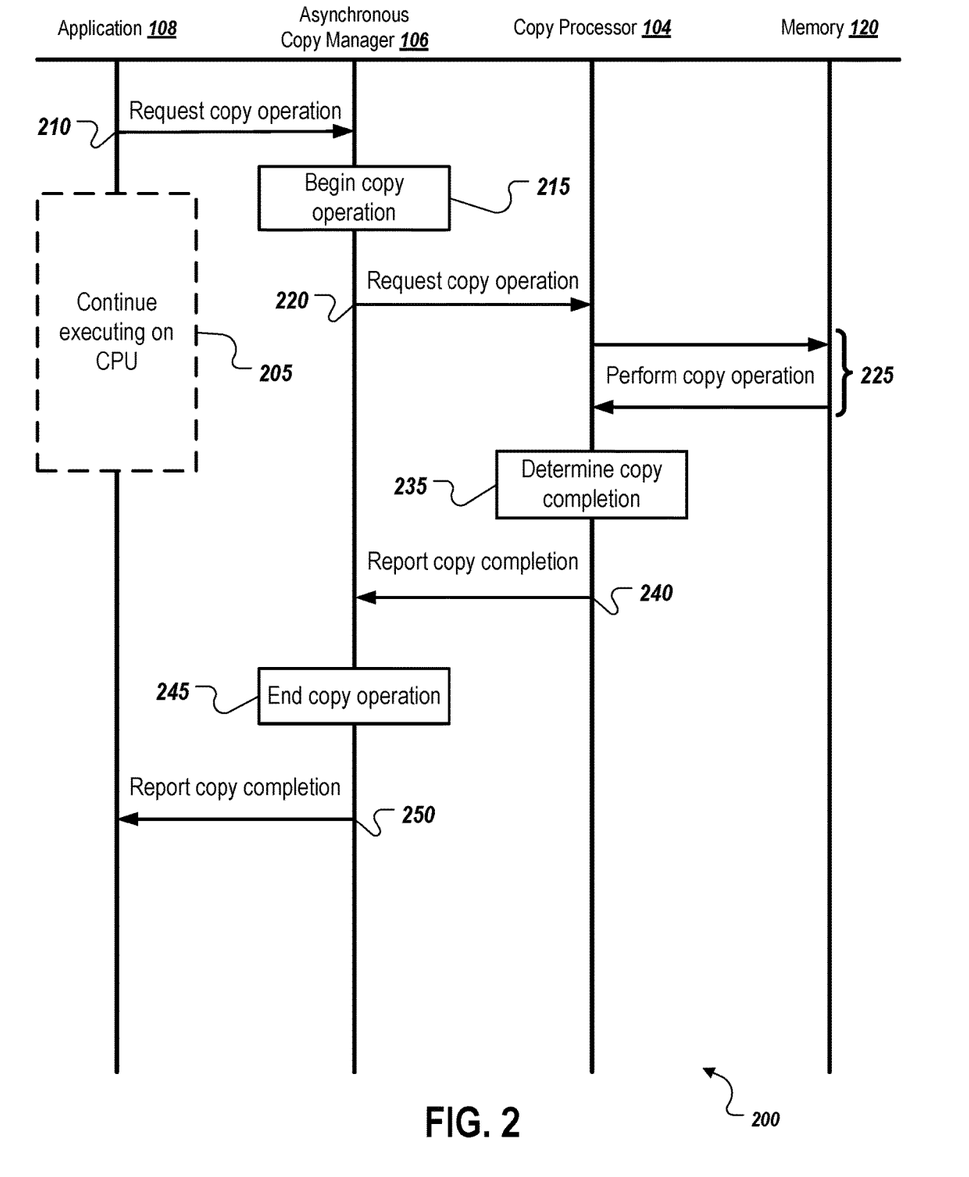
FIG. 2 is a flow diagram of an example process for providing an asynchronous copy operation.

FIG. 2 is a flow diagram of an example process 200 for providing an asynchronous copy operation. The process 200 includes interaction between an application 108, an asynchronous copy manager (asynchronous copy manager) 106, a copy processor 104, and a memory 120 for asynchronously copying data. At 210, the application 108 sends a copy operation request to the asynchronous copy manager 106. For example, the application 108 can call one or more functions within the asynchronous copy manager 106 during execution and provide information about the requested copy operation (e.g., source address, destination address, bytes to copy, an indication whether the data should be cached, notification method upon completion, etc.).

At 215, the asynchronous copy manager 106 prepares the copy operation. For example, the asynchronous copy manager 106 can analyze the requested operation, and perform various tasks before requesting the operation. In some cases, the asynchronous copy manager 106 may protect appropriate memory locations (e.g., the source and destination for the copy) before requesting the copy operation. The asynchronous copy manager 106 may also analyze the requested copy operation, and determine whether to request the operation as defined or to split the operation into multiple copy operations, such as, for example, in the case of a large copy operation. The asynchronous copy manager 106 may also perform any preparation to the virtual memory components (e.g., page tables, TLBs, etc.) to allow it to maintain synchronization of these structures during the copy operation, as described above. The asynchronous copy manager 106 may also translate any virtual memory addresses (e.g., the source and destination addresses) sent from the software application 108 to physical memory addresses within the memory At 220, the asynchronous copy manager 106 sends a copy operation request to the copy processor 104. The copy operation request includes information about the requested copy operation (e.g., source address, destination address, bytes to copy, an indication whether the data should be cached etc.). In some cases, the copy processor 104 may analyze the request to determine whether it can perform the copy operation at present. If it cannot, such as if another copy operation is in progress, the copy processor 104 may queue the request to be performed later, or may indicate to the asynchronous copy manager 106 that the request cannot be performed at present. In some cases, the asynchronous copy manager 106 may queue copy operations based on an indicated priority for the operation, such that higher priority operations are performed before lower priority ones.

At 225, the copy processor 104 interacts with the memory 120 to perform the copy operation. During the copy operation at 225, the application 108 continues to execute on the CPU, shown at 205. At 235, the copy processor 104 determines that the copy operation has completed. At 240 the copy processor 104 indicates to the asynchronous copy manager 106 that the requested copy operation has completed. This indication may be communicated using various techniques described above.

At 245, the asynchronous copy manager 106 ends the copy operation upon completion of the copy. The asynchronous copy manager 106 can, for example, unprotect any previously protected data. At 250, the asynchronous copy manager 106 reports completion of the copy operation to the application 108. This step may be omitted in cases where the application 108 has indicated an indication of completion is not required (e.g., by passing such an indication in the initial function call).

Figure 3:
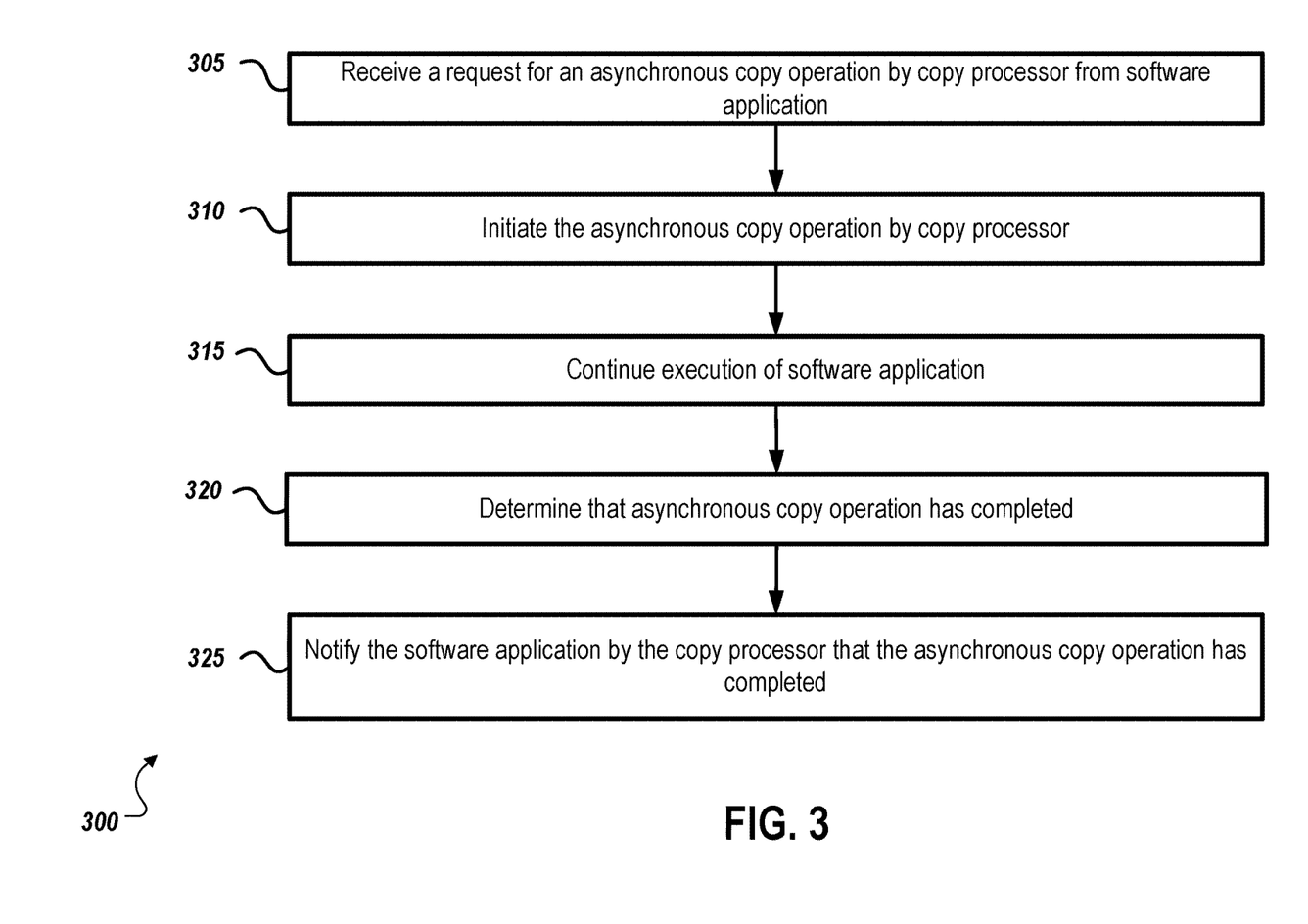
FIG. 3 depicts an example process for an asynchronous copy operation.

FIG. 3 depicts an example process 300 for an asynchronous copy operation. The process 300 can be implemented, for example, by system 100 shown in FIG. 1. At 305, a request is received for an asynchronous copy operation by a copy processor. The request can be received from a software application during execution of the software application by a processor that is separate from the copy processor. The request can also be received from a copy manager that is accessible by the software application in a user space of an operating system managing execution of the software application. In some cases, the request can be generated without the processor performing a mode switch.

At 310, the asynchronous data copy operation is initiated by the copy processor in response to the request. In some cases, initiating the asynchronous data copy operation is performed by a first processor and includes the first processor instructing a second processor different than the first processor to perform the asynchronous data copy operation. For example, the first processor can be a CPU and that instructs a second processor that is a copy processor to perform the asynchronous copy operation. At 315, the execution of the software application by the processor continues. The execution of the software application can occur continuously for all steps in process 300.

At 320, it is determined that the asynchronous copy operation has completed. At 325, in response to determining that the asynchronous copy operation has completed, the copy processor selectively notifies the software application that the asynchronous copy operation has completed. For example, the copy processor can determine that the operation has completed and send an interrupt to the asynchronous copy manager, which can communicate with the software application. As another example, the copy processor can determine that the operation has completed and set a completion flag that the asynchronous copy manager polls or checks.

Figure 4:
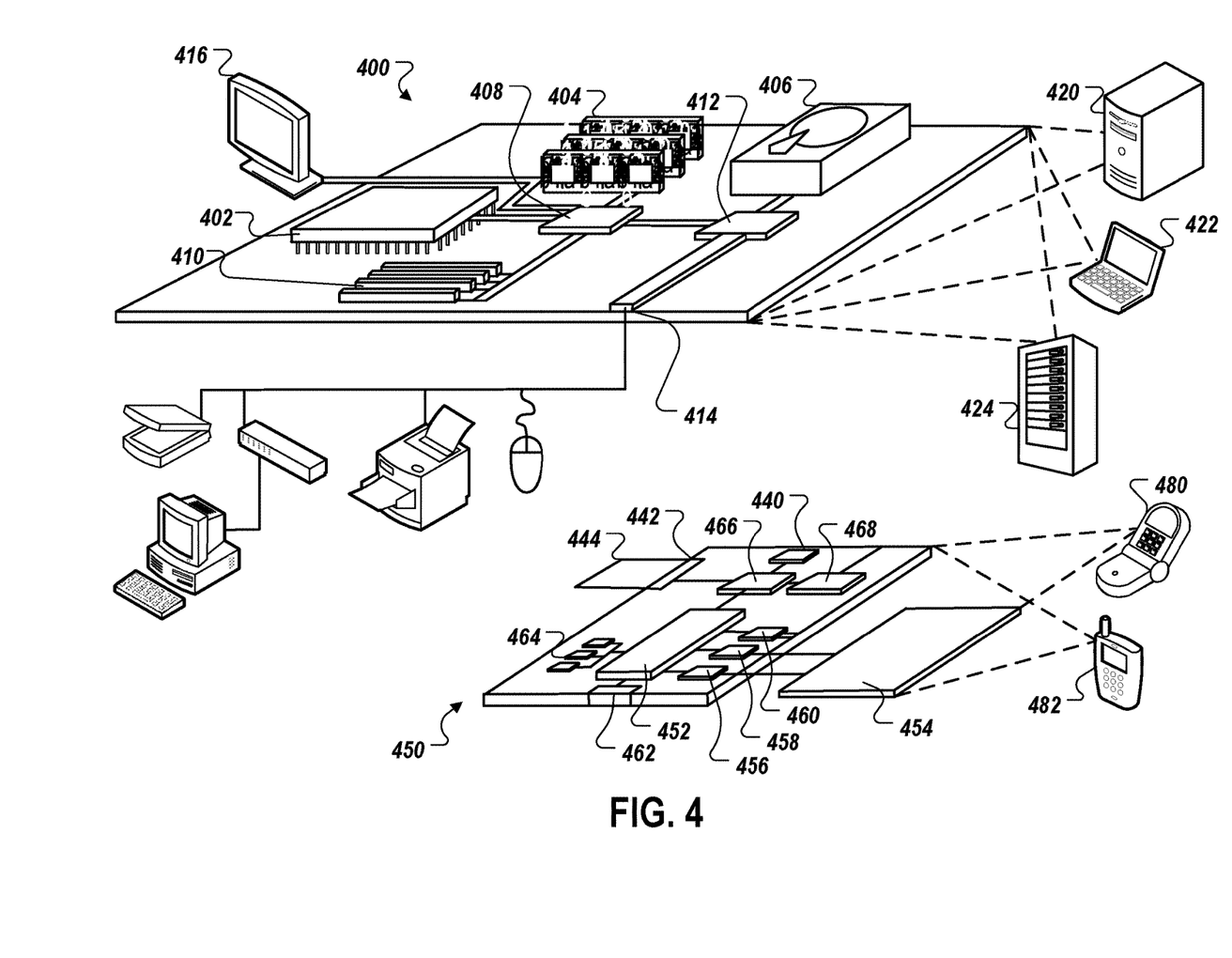
FIG. 4 is a block diagram of computing devices that may be used to implement the systems and methods described in this document.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 564, 454, 566, and 568, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 444 may also be provided and connected to device 450 through expansion interface 442, which may include, for example, a SIMM (Single In Line Memory Module) card interface. Such expansion memory 444 may provide extra storage space for device 450, or may also store applications or other information for device 450. Specifically, expansion memory 444 may include instructions to carry out or supplement the processes described above, and may include secure information also. Thus, for example, expansion memory 444 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 444, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 440 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smart phone 482, personal digital assistant, or other similar mobile device.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a transmission link for receipt by the second device, but may not include the second device receiving the data. Conversely, "receiving" from a first device may include receiving the data from a transmission link, but may not include the first device transmitting the data.

"Determining" by a computing system can include the computing system requesting that another device perform the determination and supply the results to the computing system.

Embodiments of the subject matter and the operations described in this specification can be implemented in digital electronic circuitry, or in computer software, firmware, or hardware, including the structures disclosed in this specification and their structural equivalents, or in combinations of one or more of them.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, an operating system, a cross-platform run time environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and optical disks. The processor and the memory can be supplemented by, or incorporated in, special purpose logic circuitry.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by one or more processors, the method comprising:
    during execution of a software application by a processor, receiving, by a copy processor separate from the processor, a request for an asynchronous data copy operation to copy data, wherein the request includes an indication to the copy processor to pass an interrupt to the copy manager upon completion of the asynchronous data copy operation instead of set a completion flag upon completion of the asynchronous data copy operation;
    in response to the request, initiating, by the copy processor, the asynchronous data copy operation;
    continuing execution of the software application by the processor;
    determining, by the copy processor, that the asynchronous data copy operation has completed; and
    in response to determining that the asynchronous data copy operation has completed, selectively notifying based on the indication in the request to pass the interrupt to the copy manager upon completion of the asynchronous data copy operation instead of set the completion flag upon completion of the asynchronous data copy operation, by the copy processor, the software application that the asynchronous data copy operation has completed through the interrupt instead of the completion flag.

2. The method of claim 1, wherein the request received from the copy manager is generated without the processor performing a mode switch to an operating system.

3. The method of claim 1, wherein the request includes virtual address parameters identifying a source location containing data to be copied and a destination location to which the data is to be copied.

4. The method of claim 1, wherein the request received from the copy manager includes a cache flag indicating whether the copied data should be stored in a cache associated with the processor.

5. The method of claim 1, wherein the asynchronous data copy operation indicates a source address within the memory from which to copy data and a destination address within the memory to receive the data, and the method further comprises:
before initiating the asynchronous data copy operation, protecting locations in the memory corresponding to the source and destination addresses.

6. The method of claim 5, wherein protecting the location is performed without pinning virtual memory pages associated with the locations.

7. The method of claim 6, further comprising in response to determining that the asynchronous data copy operation has completed, unprotecting the locations in the memory.

8. The method of claim 1, wherein the processor and the copy processor are co-located within a system-on-a-chip device.

9. The method of claim 1, wherein the processor and the copy processor are located in separate devices connected by a data bus.

10. The method of claim 1, wherein the processor includes a central processing unit that includes one or more processor cores and the copy processor is a hardware component that is separate from the central processing unit and separate from the one or more processor cores.

11. The method of claim 1, wherein the copy manager is separate from the copy processor and the processor, and wherein selectively notifying, by the copy processor, the software application that the asynchronous copy operation has completed comprises the copy manager notifying the software application that the asynchronous copy operation has completed in response to a notification received by the copy manager from the copy processor that indicates the asynchronous copy operation that was requested has completed.

12. The method of claim 1, comprising:
receiving a second request for a second asynchronous data copy operation;
determining that the asynchronous data copy operation is in progress by the copy processor; and
in response to determining that the asynchronous data copy operation is in progress by the copy processor, perform a synchronous copy operation using the processor instead of performing the second asynchronous data copy operation using the copy processor.

13. The method of claim 1, comprising:
receiving, by the copy processor, a second request for a second asynchronous data copy operation that includes a second indication to the copy processor to set a completion flag upon completion of the second asynchronous data copy operation instead of pass an interrupt upon completion of the second asynchronous data copy operation.

14. A non-transitory, computer-readable medium storing instructions operable when executed to cause at least one processor to perform operations comprising:
during execution of a software application by a processor, receiving, by a copy processor separate from the processor, a request for an asynchronous data copy operation to copy data, wherein the request includes an indication to the copy processor to pass an interrupt to the copy manager upon completion of the asynchronous data copy operation instead of set a completion flag upon completion of the asynchronous data copy operation;
in response to the request, initiating, by the copy processor, the asynchronous data copy operation;
continuing execution of the software application by the processor;
determining, by the copy processor, that the asynchronous data copy operation has completed; and
in response to determining that the asynchronous data copy operation has completed, selectively notifying based on the indication in the request to pass the interrupt to the copy manager upon completion of the asynchronous data copy operation instead of set the completion flag upon completion of the asynchronous data copy operation, by the copy processor, the software application that the asynchronous data copy operation has completed through the interrupt instead of the completion flag.

15. The medium of claim 14, wherein the request received from the copy manager is generated without the processor performing a mode switch to an operating system.

16. The medium of claim 14, wherein the request includes virtual address parameters identifying a source location containing data to be copied and a destination location to which the data is to be copied.

17. The medium of claim 14, wherein the request received from the copy manager includes a cache flag indicating whether the copied data should be stored in a cache associated with the processor.

18. The medium of claim 14, wherein the asynchronous data copy operation indicates a source address within the memory from which to copy data and a destination address within the memory to receive the data, and the operations further comprise:
before initiating the asynchronous data copy operation, protecting locations in the memory corresponding to the source and destination addresses.

19. The medium of claim 18, wherein protecting the location is performed without pinning virtual memory pages associated with the locations.

20. A system comprising:
memory for storing data;
a processor operable to perform first operations comprising:
executing a software application; and
a copy processor separate from the processor and communicably coupled to the memory and the processor, operable to perform second operations comprising:
during execution of the software application by the processor, receiving a request for an asynchronous data copy operation to copy data within the memory accessible by the copy processor, wherein the request is received from a copy manager accessible by the software application in a user space of an operating system managing execution of the software application and includes an indication to the copy processor to pass an interrupt to the copy manager upon completion of the asynchronous data copy operation instead of set a completion flag upon completion of the asynchronous data copy operation;
in response to receiving the request, initiating the asynchronous data copy operation;

determining that the asynchronous data copy operation has completed; and in response to determining that the asynchronous data copy operation has completed, selectively notifying, based on the indication in the request to pass an interrupt to the copy manager upon completion of the asynchronous data copy operation instead of set the completion flag upon completion of the asynchronous data copy operation, the software application that the asynchronous data copy operation has completed through the interrupt instead of the completion flag.

* * * * *